United States Patent [19]

Narbut

[11] Patent Number: 4,632,202
[45] Date of Patent: Dec. 30, 1986

[54] BEARING LUBRICATION FOR SPINDLES IN VEHICLES

[76] Inventor: Gerald S. Narbut, 4865 Warwick South, Canfield, Ohio 44406

[21] Appl. No.: 765,662

[22] Filed: Aug. 15, 1985

[51] Int. Cl.$^4$ .................................................. B60B 35/18
[52] U.S. Cl. .................... 180/70.1; 188/18 A; 301/126; 384/474
[58] Field of Search ............... 180/252, 70.1; 301/126, 301/131, 132, 133, 114; 188/218 A, 18 A; 384/474

[56] References Cited

U.S. PATENT DOCUMENTS

| | | | |
|---|---|---|---|
| 498,589 | 5/1893 | Travis | 301/126 |
| 743,829 | 11/1903 | Clark | 301/126 |
| 4,371,214 | 2/1983 | Strader | 301/132 X |
| 4,553,622 | 11/1985 | De Cortanze | 188/18 A |

FOREIGN PATENT DOCUMENTS

| | | | |
|---|---|---|---|
| 2148797 | 4/1973 | Fed. Rep. of Germany ... | 188/18 A |
| 2026962 | 2/1980 | United Kingdom ............ | 188/18 A |

Primary Examiner—John A. Pekar
Attorney, Agent, or Firm—Harpman & Harpman

[57] ABSTRACT

Spindle support arms in certain motor vehicles incorporate housings in which a drive spindle is rotatably positioned by inner and outer roller bearings rotatably positioned in bearing races. The housings are provided with lubrication passageways, such as drilled openings extending from the exterior of the housing through at least one of the bearing races to enable lubrication to be applied directly to the roller bearings in the bearing races.

4 Claims, 2 Drawing Figures

BEARING LUBRICATION FOR SPINDLES IN VEHICLES

BACKGROUND OF THE INVENTION

1. Technical Field

This invention relates to portions of vehicle wheel suspensions incorporating housings in which drive spindles are postioned by roller bearings in spaced bearing races.

2. Description of the Prior Art

Prior structures of this type usually position roller bearing assemblies in spaced relation to one another and to the means for supplying lubricant thereto. See for example U.S. Pat. Nos. 1,927,511, 2,191,876, 2,514,799, 4,172,620, 4,282,949 and 4,427,089. In each of these patent disclosures, spaced roller bearing assemblies in housings rotatably supporting shafts positioned therethrough are disclosed and in each instance, no means is provided for supplying lubricant directly to the roller bearings in the bearing race assemblies.

In U.S. Pat. No. 1,927,511, oil as a lubricant must find its way through the sides of the bearing races with the result that the major portion of the roller bearings are not lubricated.

In U.S. Pat. No. 2,191,876, radial bores in the spindle communicate with longitudinal bores therein and terminate in spaced relation to the outer sides of the bearing races in which the roller bearings are mounted so that the majority of the wear surfaces of the roller bearings are not lubricated.

In U.S. Pat. No. 2,514,799, a drilled disc is positioned adjacent one of the ball bearing races for extremely limited communication with the sides of the races resulting in the ball bearings running dry.

In U.S. Pat. No. 4,172,620, lubricant is delivered through grease fittings to an annular area at one side of the circular bearing races which remain largely unlubricated.

In U.S. Pat. No. 4,282,949, lubricant is theoretically delivered to a small annular area adjacent the sides of the bearing races in which roller bearings are positioned with the result that the bearing races remain unlubricated, and in U.S. Pat. No. 4,427,089, lubricant passageways formed in king pins 58 attempt to lubricate bearings in spaced races positioned in isolated relation to the lubricant passageways.

This invention provides lubricant openings directly in the housing and a bearing races therein insuring delivery of in lubricant through the bearing races and directly to roller bearings and their wearing surfaces engaging the bearing races.

SUMMARY OF THE INVENTION

A vehicle suspension incorporating a drive spindle rotatably positioned on roller bearings in bearing races in a housing having integral support arms is improved by the addition of lubricant delivering passageways extending through the housing in accessible locations and extending through the bearing races so as to communicate directly with the roller bearings therein for the effective delivery of lubricant directly to the bearings and their wearing surfaces engaging the bearing races.

DESCRIPTION OF THE PREFERRED EMBODIMENT

Figure 2:
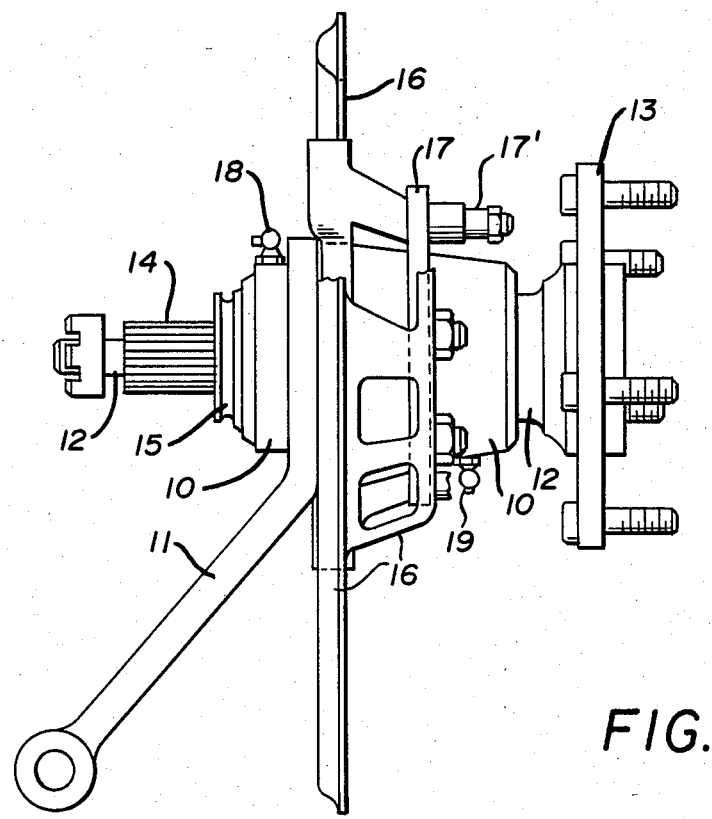
FIG. 2 is a side elevation of the drive spindle illustrating a brake flange and dust shields positioned on the housing and demonstrating the accessibility of the lubricant passageways.

In the form of the invention chosen for illustration herein, a portion of a vehicle suspension, such as used on a Corvette as manufactured by the Cheverolet Division of General Motors Corporation, is illustrated in FIG. 2 of the drawings as it appears in the operative suspension and includes a housing 10 in the form of a hollow body member having a pair of support arms 11 integrally formed therewith and extending outwardly therefrom at an angle. The housing 10 rotatably receives a drive spindle 12 which has an annular flange 13 formed integrally therewith apertured in a circumferential pattern for the reception of several bolts by which a wheel of the vehicle is attached to the drive spindle. A splined configuration 14 is formed on the other end of the drive spindle 12 with respect to the annular flange 13 to which a drive shaft is usually connected as will be understood by those skilled in the art. A first shield 15 which comprises an annular body member is positioned on the end portion of the housing 10 through which the splined configuration 14 of the drive spindle 11 extends and a second shield 16 is positioned about a brake flange 17 mounted on the housing 10, studs 17' on the brake flange movably support brake shoes (not shown).

Still referring to FIG. 2 of the drawings, it will be seen that a lubricant fitting 18 is positioned on the upper portion of the housing 10 in oppositely disposed relation to said support arms 11 and immediately adjacent the first shield 15 in a location where a grease gun or the like can readily engage the fitting and that a second lubricant fitting 19 is positioned on the lower surface of the housing 10 on the opposite side thereof with respect to the lubricant fitting 18 and is located in a position where it is readily accessible by a grease gun or the like.

Figure 1:
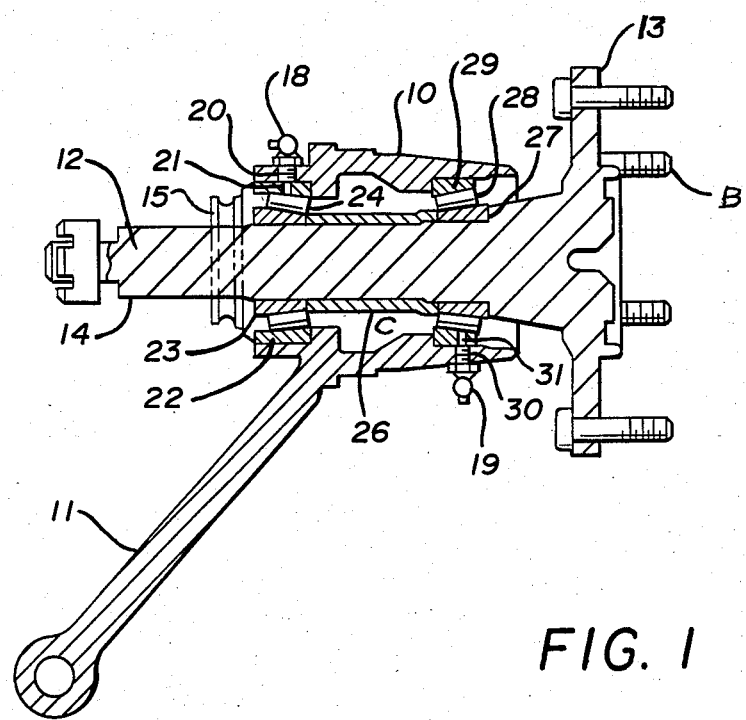
FIG. 1 is a vertical section through a drive spindle in a housing of a vehicle suspension showing the lubricant delivering passageways.

By referring now to FIG. 1 of the drawings, a vertical section through the housing 10 illustrated in FIG. 2 of the drawings and heretofore described will be seen and it will be observed that the lubricating fitting 18 is threadably mounted in a passageway 20 extending through the housing 10 in direct registry and communication with a passageway 21 in a portion 22 of an outer bearing race having a second portion 23. A plurality of circumferentially spaced roller bearings 24 are positioned between the annular bearing races 22 and 23, the bearings 24 being preferably tapered roller bearings. The portion 22 of the outer bearing race is seated in an annular inner recess in the housing 10 and against a shoulder, the portion 23 of the outer bearing race is seated on the drive spindle 12. A bearing spacer 26, which is tubular in configuration, is positioned on the drive spindle 12 in engagement with the portion 23 of the outer bearing race just described and spaces a portion 27 of an inner bearing race having a plurality of roller bearings 28 arranged in circumferentially spaced relation thereon and engaging a portion 29 thereof which in turn is positioned in an annular recess in the inner wall of the housing 10 against a shoulder.

It will be seen that the bearing races mounting the roller bearings 24 and 28 are spaced with respect to one another and that the tapered roller bearings 24 and 28 are angularly disposed with respect to one another and the axial center line of the drive spindle 12.

Still referring to FIG. 1 of the drawings, it will be seen that the second lubricating fitting 19 is threadably engaged in a secondary passageway 30 in the housing 10 in substantially oppositely disposed and spaced relation with respect to the first mentioned passageway 20 and that the secondary passageway 30 registers with and communicates with a passageway 31 in the annular portion 29 of the outer bearing race in which the tapered roller bearings 28 are disposed.

It will thus be seen that the provision of the lubricant fittings 18 and 19 and their communicating lubricant passageways 20 and 30 respectively extending through the walls of the housing 10 establish direct communication with the passageways 21 and 31 respectively in the bearing races of the outer and inner bearing assemblies respectively.

The arrangement is such that a lubricant such as delivered by a grease gun or the like to the accessible lubricant fitting 18 and 19 will be delivered directly to the surfaces of the tapered roller bearings 24 and 28 and the inner opposed surfaces of the portions 22 and 23 of the inner bearing and the portions 27 and 29 of the outer bearing assembly. An annular chamber C spaces the bearing races.

Most importantly, the provision of the lubricant fittings 18 and 19 and the communicating passageways just described enable the bearing assemblies on which the drive spindle 12 is rotatably carried to be lubricated periodically and avoid the wear which has resulted in the need of replacing the drive spindle and housing assemblies in many motor vehicles. The invention comprises the combination of the housing 10, the outer bearing races and and the communicating lubricant passageways therein and the lubricant fittings, which make possible the rebuilding of the worn drive spindles and housings including the housing support arms, which at the present time is the only method of insuring the continued lubrication of these important bearing assemblies on the drive spindles of the motor vehicles using the same.

Having thus described by invention, what I claim is:

1. An improvement in a motor vehicle drive spindle and housing therefor having bearing receiving recesses therein, support arms on said housing and bearing assemblies provided on said drive spindle and seated in said recesses, said bearing assemblies including pairs of bearing races having inner opposed surfaces and a plurality of circumferentially spaced roller bearings positioned between said inner opposed surfaces of said pairs of bearing races; the improvement comprising the combination of lubricant passageways formed in one of each of said opposed pairs of bearing races in communication with said roller bearings and secondary lubricant passageways formed in said housing in spaced relation to said support arms and in communication with said recesses and positioned for registry with said lubricant passageways in said bearing races, and means on the exterior of said housing communicating with said secondary lubricant passageways for facilitating the introduction of lubricant thereinto whereby the inner opposed surfaces of said bearing races and the roller bearings therebetween may be directly lubricated by lubricant supplied to said means on the exterior of said housing.

2. The improvement in a motor vehicle drive spindle and housing therefor set forth in claim 1 and wherein said secondary lubricant passageways are formed in said housing in readily accessible locations thereon oppositely disposed with respect to said support arms.

3. The improvement in a motor vehicle drive spindle and housing therefor set forth in claim 1 and wherein said housing has a brake flange thereon and a shield positioned around said brake flange and wherein said secondary lubricant passageways are spaced with respect to said brake flange and shield.

4. An improvement in a motor vehicle having a drive spindle and housing therefor and bearing receiving recesses in said housing, bearing assemblies provided on said drive spindle and seated in said recesses, said bearing assemblies including pairs of bearing races having inner opposed surfaces and a plurality of circumferentially spaced roller bearings positioned between said inner opposed surfaces of said pairs of bearing races, said drive spindle having an annular wheel carrying flange on one end and said housing having support arms extending angularly away therefrom in oppositely disposed relation to said wheel carrying flange, means on the ends of said support arms pivotally mounting the same to said motor vehicle, said housing and drive spindle thereby being movable on an arcuate path based on said pivot means; the improvement comprising lubricant passageways formed in one of each said opposed pairs of bearing races in communication with said roller bearings and secondary lubricant passageways formed in said housing in communication with said recesses and positioned for registry with said lubricant passageways in said bearing races, means on the exterior of said housing communicating with said secondary lubricant passageways for facilitating the introduction of lubricant thereinto whereby the inner opposed surfaces of said bearing races and the roller bearings therebetween may be directly lubricated by lubricant supplied to said means on the exterior of said housing.

* * * * *